Patented Jan. 13, 1953

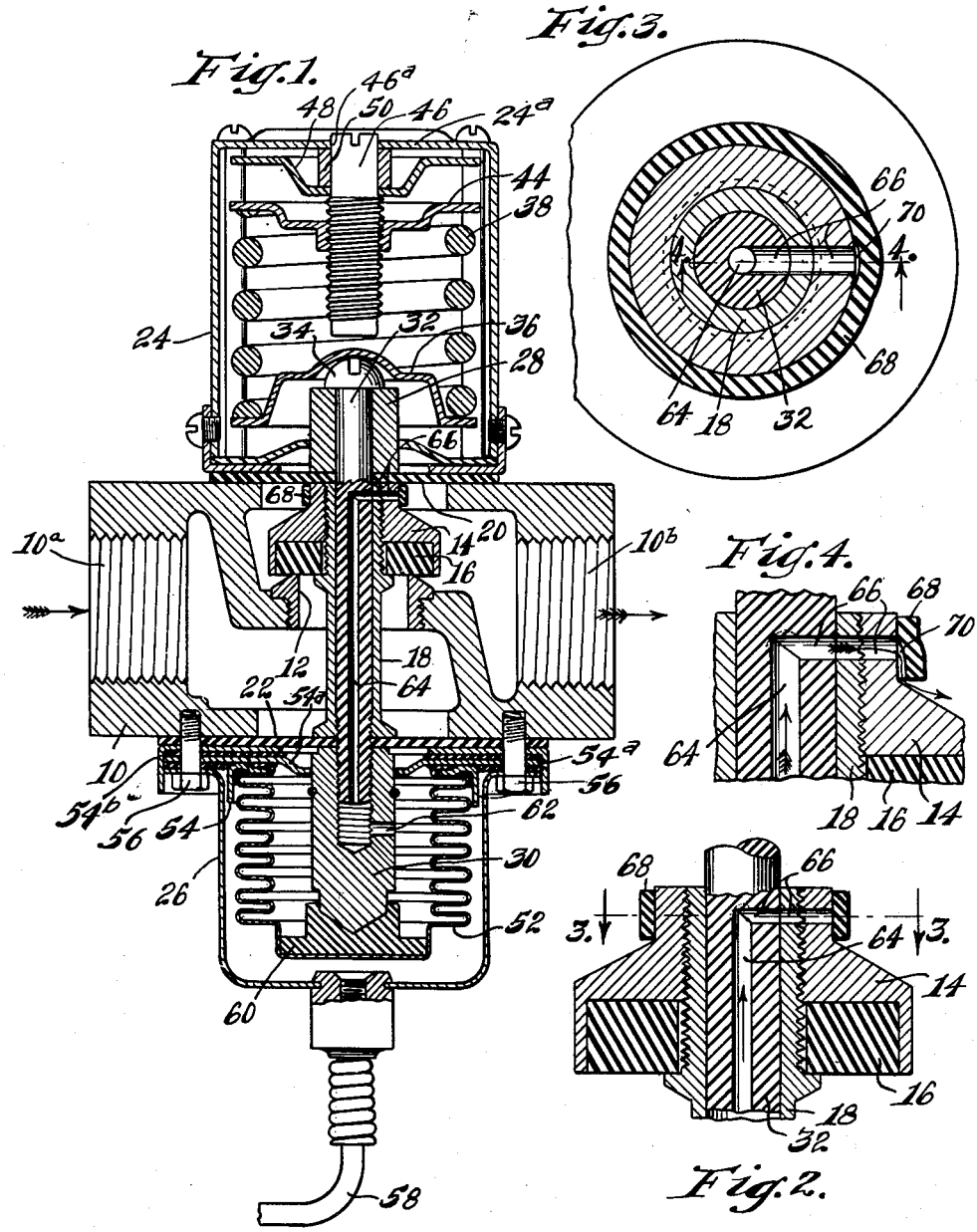

2,625,171

UNITED STATES PATENT OFFICE 2,625,171

WATER REGULATOR VALVE

Wilbur W. Wood, Middlebury, Ind., assignor to Penn Controls, Inc., a corporation of Indiana Application January 15, 1949, Serial No. 71,159

2 Claims. (Cl. 137—312)

This invention relates to a water regulator valve such as used to supply water to the condenser of a refrigeration system. Valves of this character are usually located between the source of water supply and the condenser in order to comply with city safety codes which require the water valve at the location mentioned rather than between the condenser and the drain so as to eliminate the water pressure being imposed on the condenser. These valves are usually pressure operated, the pressure being that in the refrigerant line and the valve automatically opening to permit water flow through the condenser when the refrigerant pressure is up and closing to cut off water flow when the refrigerant pressure is down, thus securing automatic flow of water only when the refrigeration system is in operation.

One type of water regulator valve is provided with a stem extending through the valve body and sealed both at the top and the bottom by diaphragms, the valve plug being carried by the stem and cooperating with a seat intermediate the diaphragms. This type of valve has a loading spring on the outside of one of the diaphragms at one end of the valve body and a pressure chamber outside the other diaphragm at the other end of the body and connected thereto with gaskets located in the connections, the pressure chamber containing a bellows connected with the valve stem to actuate the valve in opposition to the loading spring. While these gaskets and diaphragms are made of material which withstands pressure satisfactorily, there are times when they or the bellows spring a leak and if the leak happens to be in the diaphragm next to the bellows it may permit refrigerant to enter the water line and contaminate the water therein.

To eliminate this possibility, my present invention consists of providing a passageway from the interior of the bellows lengthwise through the valve stem to the outlet side of the valve, the passageway passing through the valve plug itself and thereby permitting any refrigerant leaking from the pressure chamber to flow to the outlet side of the valve instead of getting into the water supply line. Also if the diaphragm next to the bellows leaks water, such water may flow from the outlet of the water regulator valve instead of changing its setting due to the pressure of the leaking water opposing the pressure of the refrigerant on the bellows.

By providing the passageway referred to, any leak will be denoted by flow of the leaking water from the outlet of the valve into the condenser and from the condenser into the sewer or other point of discharge, thus giving a visual and audible indication that the diaphragm requires renewal.

The main object of my invention is to provide a simple arrangement serving as a check valve to permit flow of the leaking refrigerant or water from the outlet side of the valve without any possibility of reverse flow of either liquid when any leak develops.

With these and other objects in view, my invention consists in the construction, arrangement and combination of the various parts of my device whereby the objects contemplated are attained, as hereinafter more fully set forth, pointed out in my claims and illustrated in the accompanying drawings wherein:

Figure 1 is a vertical sectional view through a water regulator valve to which my invention has been applied;

Figure 2 is an enlarged sectional view of the valve plug and asociated parts showing my invention in further detail.

Figure 3 is an enlarged sectional view on the line 3—3 of Figure 2, and

Figure 4 is a sectional view of a portion of Figure 2 and on the line 4—4 of Figure 3 showing the check valve in operation.

On the accompanying drawing I have used the reference numeral 10 to indicate a valve body having a seat 12. A valve plug 14 is provided therefor and has a resilient insert 16 for engaging the seat. The valve plug 14 is mounted on a stem 18, at opposite ends of which are diaphragms 20 and 22. These diaphragms are sealed against the valve body 10 by a spring housing 24 and a pressure housing 26, respectively.

The centers of the diaphragms are sealed against the valve plug 14 and the lower end of the stem 18 by a collar 28 and a threaded sleeve 30. A bolt 32 extends through the collar 28 and the stem 18 and is threaded into the sleeve 30 as illustrated to hold the parts assembled. It has a head 34 against which a spring seat 36 is engaged, a loading spring 38 being interposed between the seat 36 and a second seat 44.

The seat 44 is threaded on an adjusting screw 46 which is rotatable in an opening 46a in the top 24a of the spring housing 24. The upper end of the thread on the screw 46 forms a shoulder against which a washer 48 is positioned and a thrust collar 50 extends from this washer to the spring housing top 24a.

The pressure housing 26 has therein a bellows 52 soldered to flanges 54 and 54a. The pressure housing 26 is then held against the flange 54a, which flange is held against a flanged plate 54b by screws indicated at 56 with suitable gaskets between, the diaphragm 22 serving as a gasket between the flanged plate 54b and the valve body 10. A copper tube 58 extends from the housing 26 which communicates with a suitable source of pressure in the usual manner such as the refrigerant line of refrigeration system on the high pressure side thereof.

The bellows 52 has a head 60 for engagement with the sleeve 30 to actuate the stem 18 in an upward direction in opposition to the spring 38 when the pressure in the housing 26 is increased sufficiently to overcome the action of the spring in a well known manner. The interior of the bellows may be considered the inactive side thereof and the exterior thereof the active side as the latter is subject to the actuating pressure in the tube 58.

The foregoing described water regulator valve is merely an example of one type of valve to which my invention may be applied. The invention consists in providing a passageway from the interior of the bellows 52 to the outlet side 10b of the valve body 10. This may be done by drilling holes 62, 64 and 66 in various parts of the valve, the hole 62 being through the wall of the sleeve 30, and the hole 64 being lengthwise at the axis of the bolt 32 and extending from its lower end to the hole 66. The hole 66 is drilled through the valve plug 14, the stem 18 and into the side of the bolt 32 to meet the hole 64. These holes provide the desired passageway so that any leakage of the diaphragm 22 is taken care of by the water therefrom that enters the bellows 52 being discharged through the holes 62, 64 and 66 to the outlet 10b of the valve body.

In order to insure against water on the outlet side of the valve from passing back through the holes 66, 64 and 62 into the bellows 52 a check valve arrangement is desirable. I have found the simplest mechanism for this purpose is to provide a band of neoprene, rubber or the like 68 around the upper marginal end of the valve plug 14. This band covers the outlet end of the hole 66 and prevents any return flow of fluid. When refrigerant or water flows as indicated by the arrows in Figure 4 it opens a crevice-like passageway between the band 68 and the valve plug 14 as illustrated in this figure and in Figure 3 at 70. This arrangement permits the flow of fluid in the desired direction due to either refrigerant or water pressure build-up inside the bellows 52 but prevents reverse flow (as when the diaphragm 22 is not leaking but there is pressure in the outlet side of the valve 10 greater than within the bellows 52).

Having described a means to take care of the refrigerant and/or water that leaks into the bellows 52 it will be obvious that the means for this purpose is comparatively simple and inexpensive as far as manufacturing is concerned, yet the desired results are secured with a minimum of additional manufacturing operations performed on the water valve and the addition of only one element—the band 68.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a water regulator valve, a valve body having a seat between opposite surfaces thereof, diaphragms for sealing said surfaces, a stem between said diaphragms, a valve plug on said stem, a bellows for operating said valve plug, and a bellows housing for said bellows and connected with a source of pressure independent of the water that flows through said water valve; the improvement consisting of means to take care of leakage of water from said valve body into said bellows comprising a passageway leading from the interior of said bellows, longitudinally through said stem and through said plug to the outlet side thereof and check valve means to permit the flow of such leakage water from said bellows through said passageway and prevent reverse flow of water from the outlet side of said plug into said passageway.

2. In a water regulator valve, a valve body having opposite surfaces, sealing diaphragms for said surfaces, a stem between said diaphragms, a valve plug on said stem for coaction with a valve seat within said valve body and a power element for said stem having an active side and an inactive side; the improvement consisting of means to take care of leakage of water from said valve body to the inactive side of said power element comprising a passageway leading from said inactive side through said stem and plug to the outlet side of the plug, and means to prevent reverse flow of fluid through said passageway.

WILBUR W. WOOD.

REFERENCES CITED

The following references are of record in the file of this patent:

UNITED STATES PATENTS

| Number | Name | Date |
|---|---|---|
| 1,326,445 | Fewlass | Dec. 30, 1919 |
| 1,633,692 | Clapp | June 28, 1927 |
| 2,042,523 | Graham | June 2, 1936 |
| 2,154,901 | Hulse | Apr. 18, 1939 |
| 2,285,049 | Parks | June 2, 1942 |
| 2,365,650 | Shaw | Dec. 19, 1944 |

FOREIGN PATENTS

| Number | Country | Date |
|---|---|---|
| 489,565 | Germany | Jan. 17, 1930 |